April 14, 1953 A. M. KASNOWICH 2,634,984

RECORD CHANGER FOR PHONOGRAPHS

Filed Oct. 10, 1946 7 Sheets-Sheet 1

INVENTOR
Anthony M. Kasnowich
BY
Clarence J. Loftus
ATTORNEY

April 14, 1953 A. M. KASNOWICH 2,634,984

RECORD CHANGER FOR PHONOGRAPHS

Filed Oct. 10, 1946 7 Sheets-Sheet 2

INVENTOR
Anthony M. Kasnowich
BY
Clarence J. Loftus
ATTORNEY

RECORD CHANGER FOR PHONOGRAPHS

Filed Oct. 10, 1946 7 Sheets-Sheet 3

INVENTOR
Anthony M. Kasnowich
BY Clarence J. Loftus
ATTORNEY

April 14, 1953 A. M. KASNOWICH 2,634,984

RECORD CHANGER FOR PHONOGRAPHS

Filed Oct. 10, 1946 7 Sheets-Sheet 4

INVENTOR
Anthony M. Kasnowich
BY
Clarence J. Loftus
ATTORNEY

April 14, 1953 A. M. KASNOWICH 2,634,984

RECORD CHANGER FOR PHONOGRAPHS

Filed Oct. 10, 1946 7 Sheets-Sheet 5

INVENTOR
Anthony M. Kasnowich
BY
Clarence J. Loftus
ATTORNEY

April 14, 1953 A. M. KASNOWICH 2,634,984

RECORD CHANGER FOR PHONOGRAPHS

Filed Oct. 10, 1946 7 Sheets-Sheet 6

INVENTOR
Anthony M. Kasnowich
BY
Clarence J. Loftus
ATTORNEY

April 14, 1953 A. M. KASNOWICH 2,634,984

RECORD CHANGER FOR PHONOGRAPHS

Filed Oct. 10, 1946 7 Sheets-Sheet 7

INVENTOR
Anthony M. Kasnowich
BY
Clarence J. Loftus
ATTORNEY

Patented Apr. 14, 1953 2,634,984

UNITED STATES PATENT OFFICE 2,634,984

RECORD CHANGER FOR PHONOGRAPHS

Anthony M. Kasnowich, Grand Rapids, Mich., assignor, by mesne assignments, to A M I Incorporated, a corporation of Delaware Application October 10, 1946, Serial No. 702,479

10 Claims. (Cl. 274—10)

The present invention relates generally to record changers for automatic phonographs of the general character exemplified in U. S. Patent Re. 21,514, issued July 23, 1940, to the Automatic Instrument Company, common assignee of that patent and the present invention and application.

The present invention relates specifically to a novel record changer which automatically sets itself to place record discs of various diameters in position to be played, and also automatically sets itself to play record discs of various diameters.

The main object of the invention is to provide a record changer which can handle either 10 inch or 12 inch record discs without any manual adjustments.

Another object of the invention is to provide a record changer which can operate automatically and continuously to play both 10 inch and 12 inch record discs, either or both types of discs being contained in its magazine of available selections.

It is also an object of the invention to provide a record changer which can securely grasp and transport either 10 inch or 12 inch record discs from a magazine to a turntable, before record play, and back to the magazine, after record play, without any manual adjustments.

A further object of the invention is to provide a record changer which automatically sets the tone arm needle or pickup at the beginning of the record groove when the disc is laid on the turntable, whether the record disc has a diameter of 10 inches or 12 inches.

One problem solved by the present invention is broadly to provide a record changer which can handle records of various diameters without the intervention of a manual operater. The present invention in one aspect represents a solution wherein the record disc diameter itself determines the setting, so that no operator is required. The invention includes, of course, many other important features.

Further objects of the invention are to provide an improved mechanism for actuating the record-gripping members of a record changer and to provide an improved record-gripper assembly.

Another broad object of the invention is to provide a smooth-acting and reliable mechanism for causing the gripper assembly to twist in one direction or the other during transportation of the record between magazine and turntable, thus to determine which side of a record disc will be played.

Other objects and capabilities of the invention will become apparent from the following description of the accompanying drawings, in which I completely disclose one illustrative embodiment of my invention.

Figures 4, 5, 6:
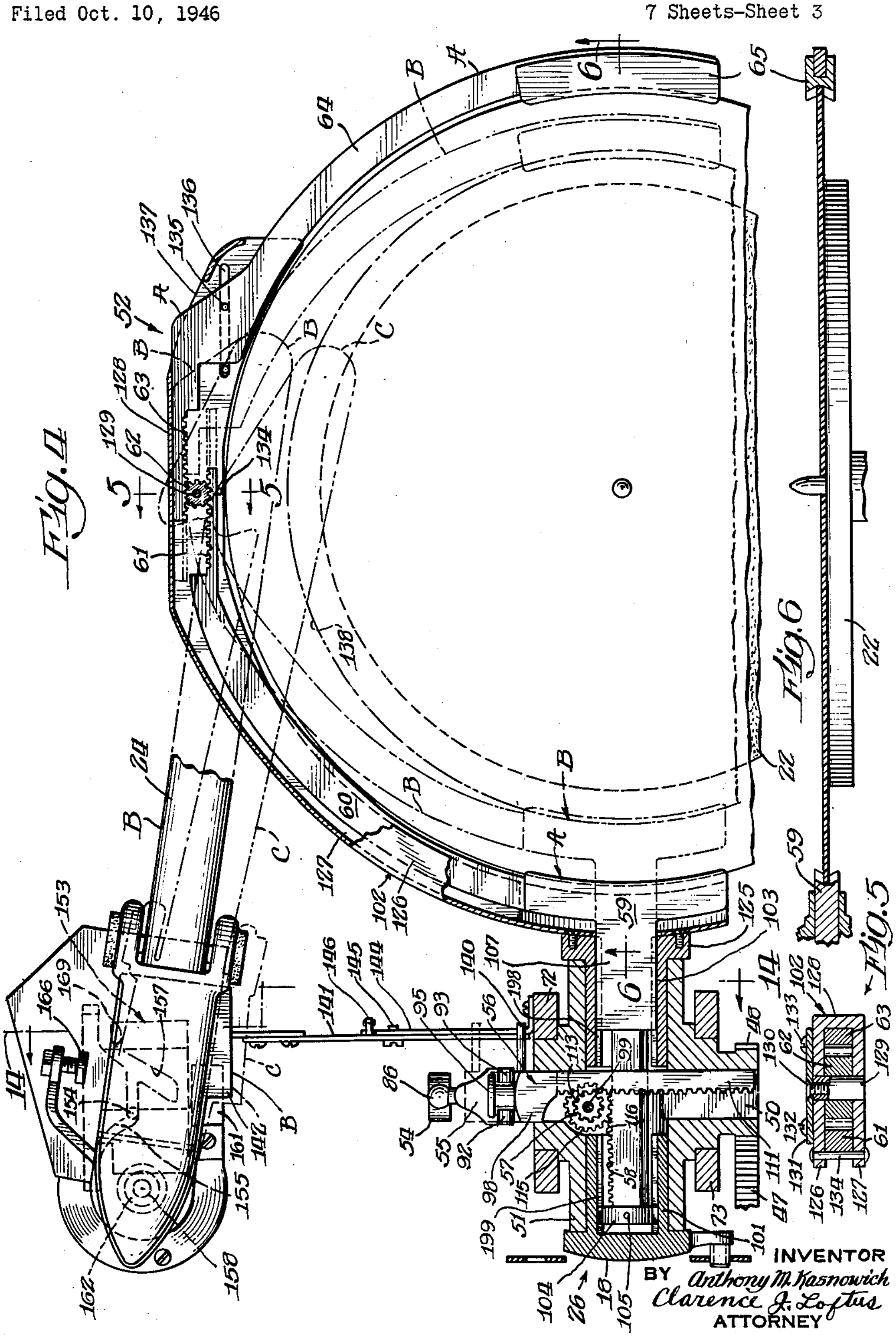
Fig. 4 is a sectional view (line 4—4, Fig. 3) illustrating the transfer mechanism, tone arm, turntable, grippers, setting mechanism and tone arm cam, showing in dashed lines various positions of the parts when a record disc is delivered to the turntable.
Figures 7, 8:
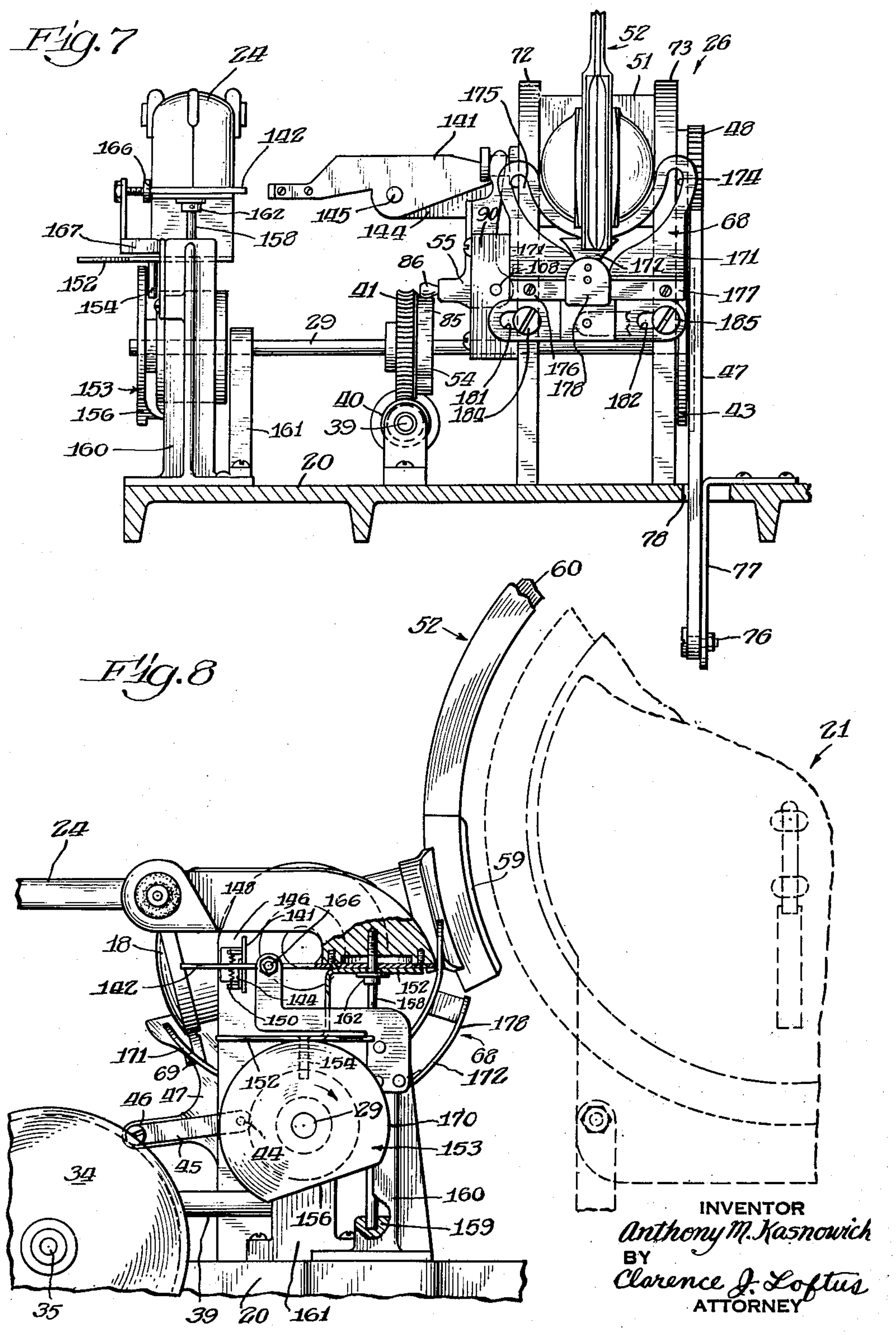
Figure 10:
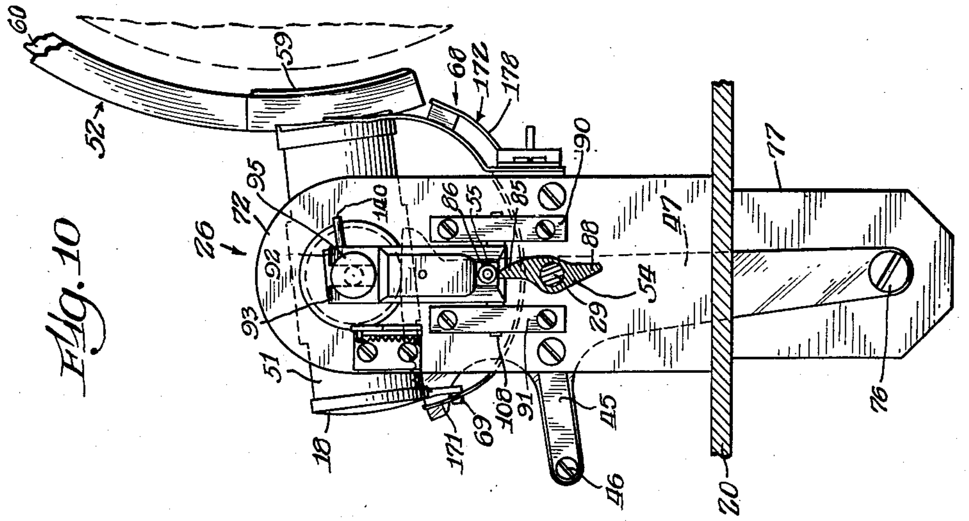
Figure 9:
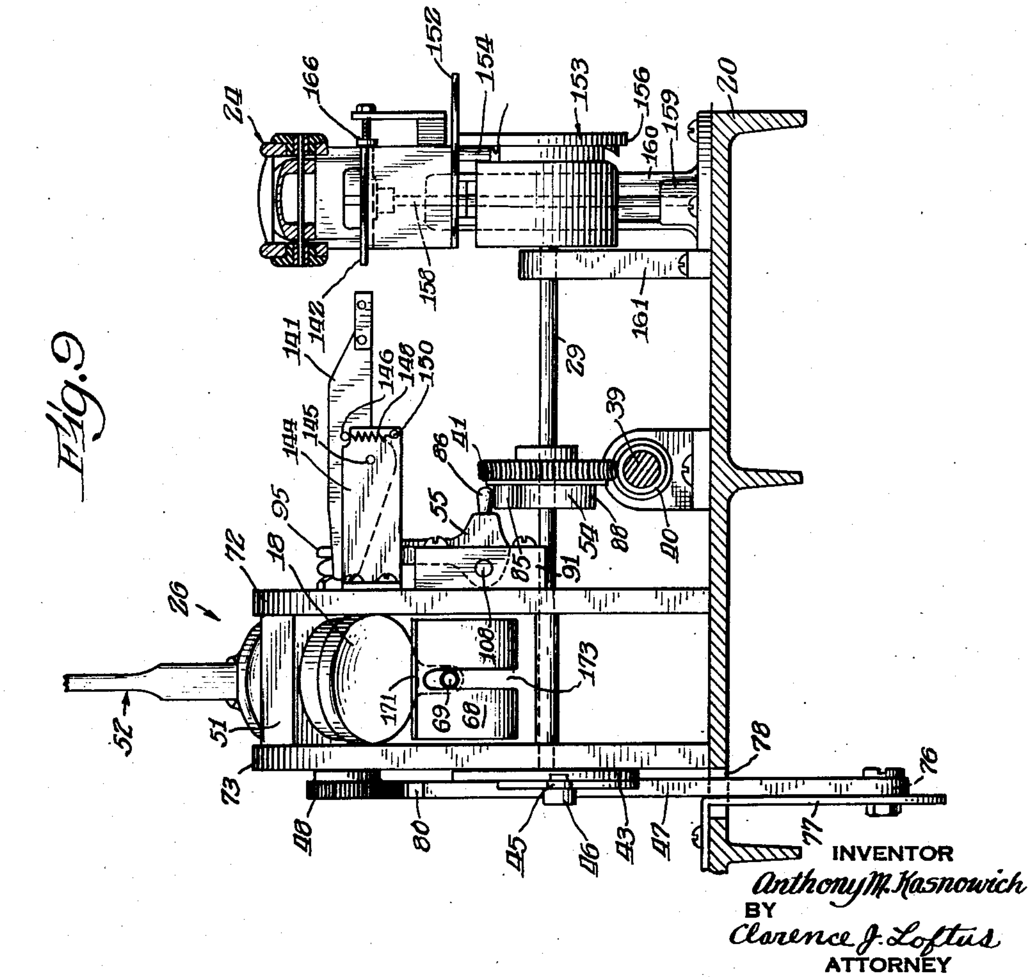
Figures 11, 12:
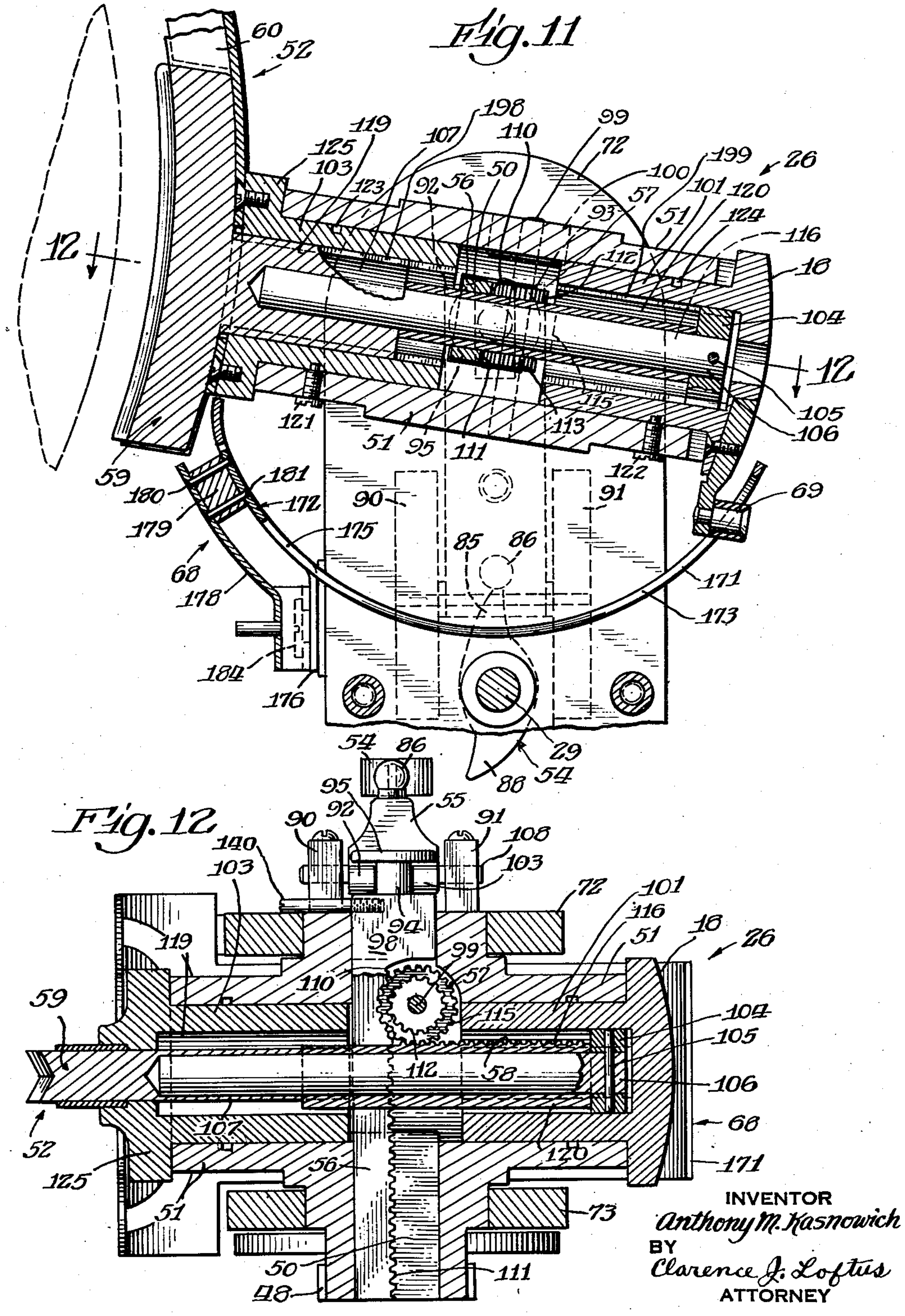
Figures 13, 14:
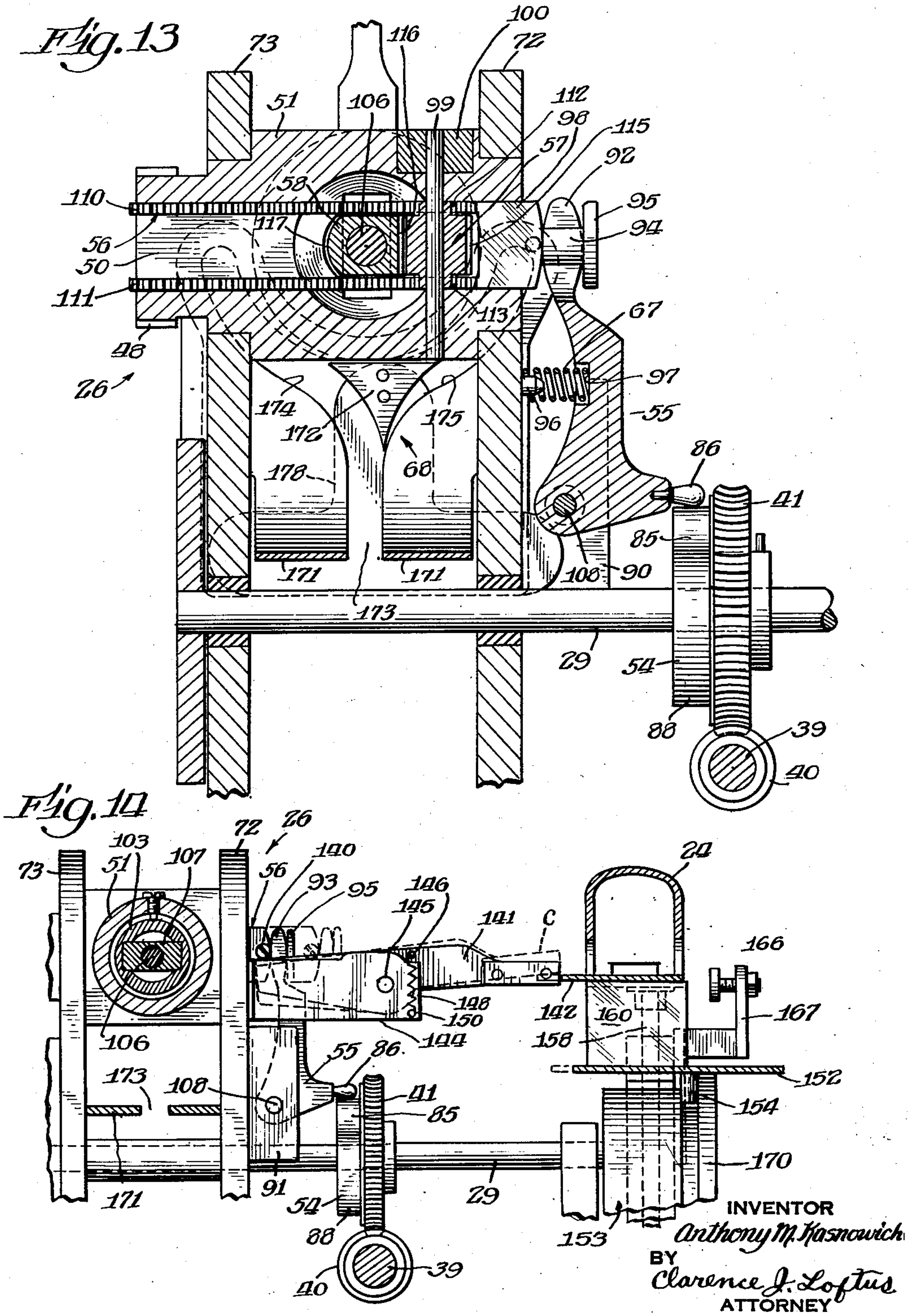

Figs. 5 and 6 are sectional views taken on lines 5—5 and 6—6 of Fig. 4, respectively;

Fig. 7 is a left side elevational view (line 7—7, Fig. 1) showing the positions of the transfer mechanism, the tone arm and the mechanism for automatically setting the record changer for 10 inch or 12 inch disc operation, when the grippers are ready to grasp a record disc from the magazine;

Fig. 8 is a rear view (line 8—8, Fig. 1) showing the tone arm cam, the setting mechanism and the tone arm, when the grippers are in that ready position;

Fig. 9 is a right side elevational view (line 9—9, Fig. 1) showing the mushroom, mushroom guide, tone arm and setting mechanism when the grippers are still in that ready position, some of the parts being shown in section;

Fig. 10 is a rear (line 10—10, Fig. 1) view showing the transfer mechanism when the grippers are in the ready position;

Fig. 11 is a front elevational sectional (line 11—11, Fig. 1) view of the inner gripper and the transfer mechanism, showing the positions of the parts when the grippers are relaxed or open and before a record disc is grasped from the magazine;

Fig. 12 is a top sectional view (line 12—12, Fig. 11) of the transfer mechanism and inner gripper, showing the positions of the parts before a record disc is gripped and while the grippers are open;

Fig. 13 is a right end sectional elevational view (line 13—13, Fig. 1) of the transfer mechanism, showing the positions of the parts when the grippers are ready to grasp a record disc in the magazine;

Fig. 14 is a right end sectional elevational view (line 14—14, Fig. 4) showing the positions of the setting mechanism parts, in dashed lines for playing a 10-inch record and in full lines for playing a 12-inch record, just as the tone arm is being placed on the turntable.

*The general plan and operation*

Figure 1:
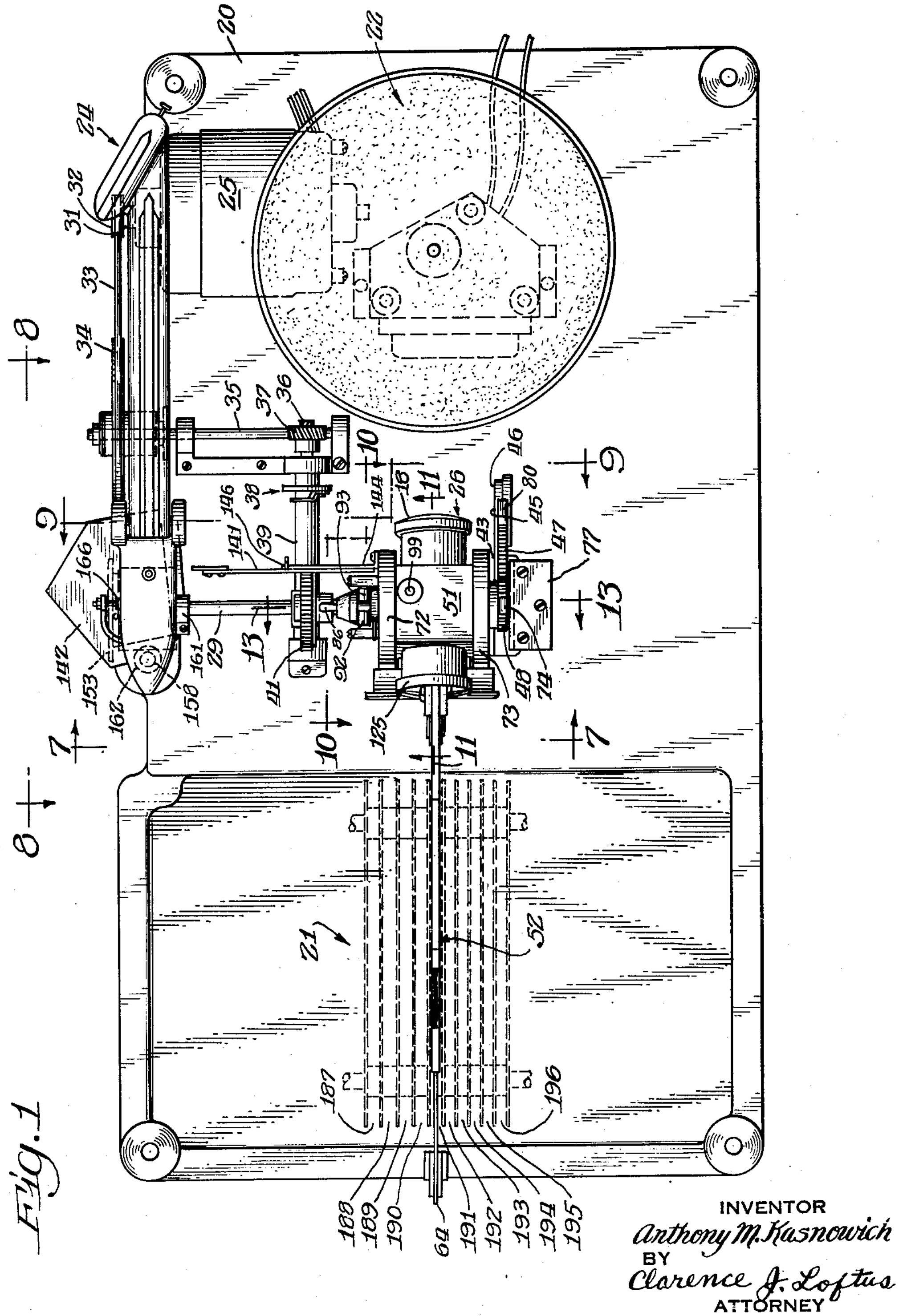
Fig. 1 is a top plan view of an automatic record changer incorporating a preferred form of my invention.

Referring first to Fig. 1 the record changer comprises a base 20, a reciprocating record disc magazine 21, a playing turntable 22, a tone arm 24, an electric driving motor 25, and a transfer mechanism 26.

The record discs representing the various selections are placed in the compartments 187—196 of the magazine 21. This record changer plays both sides of the discs, so that twenty selections are available. When a selection is made, motor 25 drives the record magazine forwardly and/or rearwardly with a reciprocating motion until the selected record disc attains the transfer position (the record in compartment 191 is in that position in Fig. 1). When the selected record reaches that position the magazine stops. If the record magazine is arrested from a forward motion the front side of that record is played. If it is arrested from a rearward motion the rear side is played. The selector or means by which the selection is made, the shafts and gearing by which motor 25 drives magazine 21, and the clutches and controls by which motor 25 and magazine 21 are coupled when a selection is made and uncoupled when the selected record reaches the transfer position are not here shown for the reason that they are fully disclosed in the aforementioned Green patent and are therefore well known to the art.

When the selected record reaches the transfer position it is grasped by the transfer mechanism 26 and placed on the turntable 22 with the proper side up, so that the desired selection is played. Motor 25 also drives the transfer mechanism. A motion train between the transfer mechanism 26 and the tone arm 24 causes the tone arm to be placed in playing position as the selected record disc is laid on the turntable.

When the record has been played motor 25 again drives the transfer mechanism 26 and causes the tone arm 24 to be lifted off of the record disc and the record disc to be returned to the turntable. The means for coupling motor 25 to the transfer mechanism when the record disc attains the transfer position, the control means for actuating the coupling means, the means for coupling the motor to the transfer mechanism after record play is completed, and the control means for actuating the last-named coupling means, as well as the means for causing the transfer mechanism to stop at the end of the record delivery and record-return phases need not be here shown, for the reason that they are shown in the aforementioned Green patent and/or in my copending application Serial No. 668,682, filed in the U. S. Patent Office on May 10, 1946, entitled "Automatic Phonograph" and assigned to the assignee of the present application and invention.

My invention resides in the transfer and gripper-actuating mechanism 26, in the gripper assembly 52 and mechanism whereby the grippers automatically handle either 10-inch or 12-inch records, in the mechanism whereby the tone arm is automatically set to play either 10-inch or 12-inch records, and in the mechanism for causing the mushroom 18 (Fig. 1) to twist the record in one direction or another during transportation between magazine and turntable, as well as in various combinations of my novel mechanisms with other record-changer components. Reference is made to the aforesaid Green patent and copending application for a complete description of those parts of the record changer which need not be illustrated or described in detail in disclosing the present invention.

In view of the art to which reference has been made, this detailed disclosure of this invention begins by pointing out that shaft 29 (Fig. 1) turns in a counterclockwise direction, as seen from the front, whenever a record disc is to be grasped and moved, whether from the magazine to the turntable or from the turntable to the magazine. Power to turn shaft 29 is derived from motor 25, through the motor shaft 31, pulley 32, belt 33 (Fig. 2), pulley 34, shaft 35, worm wheel 36, pinion 37, clutch 38 (Fig. 1), shaft 39, worm 40, gear 41 (Fig. 9). It will be seen that shaft 29 turns whenever clutch 38 closes motion train 25, 31—41, 29, but does not turn when the clutch is open. The means by which shaft 29 is powered at the proper times by operation of clutch 38 is fully disclosed in my aforesaid copending application and the above summary description thereof is herein sufficient.

One broad function of shaft 29 is to drive the transfer mechanism to cause mushroom 18 and gripper assembly 52 to turn about an axis parallel to shaft 29 when a record disc is transported from the magazine to the turntable, and again when the disc is returned to the magazine. The motion train for this task begins at shaft 29 (Fig. 1), and continues through plate 43 (Fig. 2), pivot 44, link 45, pivot 46, quadrant or sector gear 47, gear 48, barrel 51, and the gripper assembly 52 (Fig. 4). It should be noted that this motion train 29, 43—48, 51—52 is closed and that the record disc is transported only when the following conditions are satisfied: First, shaft 29 is running; second, the gripper assembly 52 is closed on a record disc; third, the teeth of gear 47 are engaging those on gear 48.

Another broad function of shaft 29 is to power the gripper assembly to release a record disc. The motion train for this purpose begins at shaft 29 and proceeds through cam 54 (Figs. 4 and 10), lever 55, rack 56 (Figs. 4 and 13), cluster pinion 57, rack 58, (Figs. 4, 11 and 12), collar 104 (Fig. 12), pin 105, connecting member 106, shank 107 of the inner gripper 59 and inner gripper member 59. As the inner gripper member 59 is pulled away from a record disc, arc 60 moves to the left (Fig. 4), and the action of rack portion 61, gear 62 and rack portion 63, is such as to move arc 64 and outer gripper member 65 to the right (Fig. 4) or away from that disc.

The power for closing the gripper members on a record disc is derived from a spring 67 (Fig. 13). While the high surfaces of cam 54 tend to push lever 55 in a direction to release the grippers, spring 67 tends to push lever 55 in a direction to close the grippers. The motion train for closing the grippers is traced from spring 67, through elements 55—58, 107, 59 and 59—65.

Still another broad function of shaft 29 is to drive the tone arm cam 153 (Fig. 4) which positions tone arm 24.

The side of the record disc to be laid down on the turntable is determined by a guiding mechanism 68 (Fig. 7) which cooperates with a projection or lug 69 (Fig. 10) on the mushroom 18 to twist the disc in one direction or the other during transportation.

The novel gripper assembly illustrated in Fig. 4 handles either 10 or 12 inch record discs. The novel mechanism illustrated in Figs. 7, 8, 9 and 14 automatically sets the tone arm in place for either 10 inch or 12 inch records. The transfer mechanism parts illustrated in Figs. 2, 3, 11, 12 and 13 include novel gripper actuating features. The mushroom guiding mechanism illustrated in Figs. 7, 8, 9 and 10 has novel features. Particular attention is directed to those four features.

*The transfer mechanism and gripper assembly*

The transfer mechanism comprises a barrel 51, having the general contour of a pipe joint, with a rectangular axial bore 50 and a transverse bore. The barrel is journaled for rotation by posts 72 and 73 (Figs. 1, 7 and 4) integral with base 20. Slidably mounted in bore 50 is a rectangular rack 56. Integral with the barrel is a gear 48, formed with two diametrically opposed flats 74 and 75 (Figs. 2 and 3), for a purpose to be explained hereinafter. Pivotally secured at 76 (Figs. 2 and 7) to a bracket 77 mounted on base 20, and projecting through a slotted opening 78 in the base is a quadrant gear 47, formed with flats 80 and 81. This quadrant gear is caused to move with an oscillating motion by shaft 29. For this purpose one end of shaft 29 carries a rigidly mounted circular plate wheel 43 having an eccentrically mounted pivot 44 for link 45. Link 45 is in turn pivotally secured at 46 to gear 47.

Figures 2, 3:
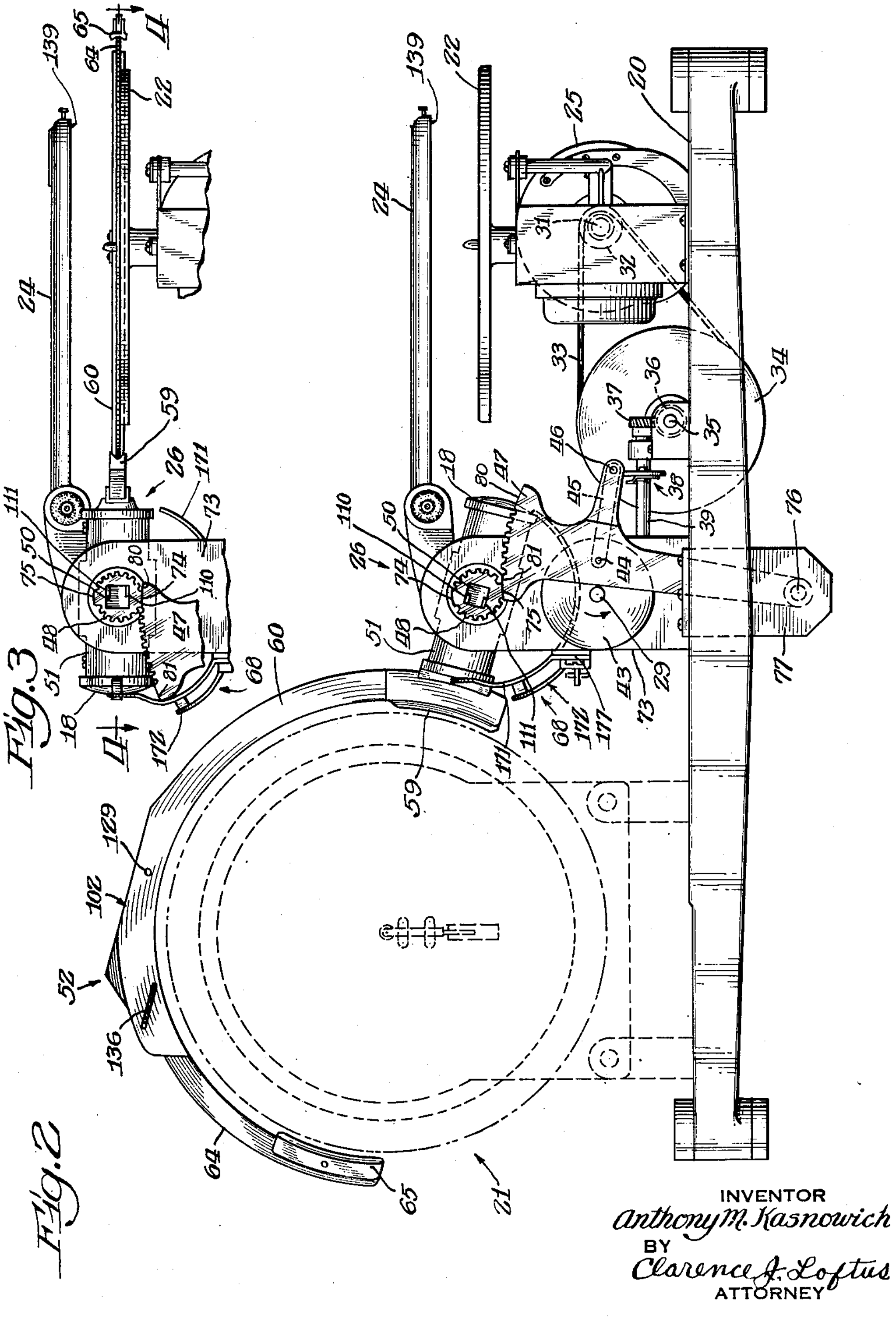
Fig. 2 is a front view of the record changer.
Fig. 3 is a fragmentary front view of parts of the transfer mechanism as they appear when a record is delivered to the turntable.

When a selected record disc reaches the transfer position shaft 29 starts to turn counterclockwise (as viewed from front) and gear 47 starts to move to the left (Fig. 2). The gear moves for a certain interval without turning gear 48, since flat 81 slips on flat 75 until the teeth of gear 47 pick up the teeth of gear 48. During this interval the high surface 85 (Figs. 9 and 10) of cam 54, which has been keeping integral knob 86 of lever 55 up and the gripper members open, moves clockwise, as seen from the rear, and permits knob 86 to fall down to the low surface of the cam 54, so that spring 67 pushes lever 55 out (clockwise, as seen from right side, Fig. 13) and closes the gripper members on the record disc.

Then gear 47 meshes with gear 48 and turns the whole barrel and gripper assembly 52 clockwise about the axial bore of the barrel to transport the record disc from magazine to turntable.

As the record disc is laid on the turntable flat 80 slips on flat 74 (Fig. 2), so that gear 48 stops before gear 47 does. During that interval between the stopping of gear 48 and stopping of gear 47, high surface 88 of cam 54 (Fig. 10) strikes knob 86 and causes lever 55 (Fig. 13) to be turned counterclockwise, as seen from the right, so that the grippers are opened and the record disc is released. By that time pivot 44 will have reached a position approximately 180 degrees away from that shown in Fig. 2 and shaft 29 stops.

After the record disc is played, shaft 29 again turns in the same direction as before, but pin 44 and gear 47 then move to the right (Fig. 2). Flats 74 and 80 slip and element 88 clears element 86 while the record is again gripped. Then gear 47 meshes with gear 48 and turns barrel 51 counterclockwise, as viewed from the front, about its axial bore while the record is returned to the magazine. Finally gear 48 stops and cam surface 85 lifts knob 86 and causes the grippers to be released while flat 81 slips on flat 75, restoring the initial conditions shown in Figs. 2 and 10. Then shaft 29 and gear 47 stop. A mechanism for obtaining rotation of barrel 51 in two directions while rotating shaft 29 always in one direction is broadly disclosed and claimed in my aforementioned copending application. The mechanism by which I obtain lag between the motions of gears 47 and 48 is a novel feature of the automatic phonograph transfer mechanism herein shown.

Referring now to Figs. 13 and 10, shaft 29 carries for rotation a rigidly fitted cam 54, the high surface 85 of which lifts knob 86 as the gripper assembly is released from a record disc while at the magazine and the high surface 88 of which lifts knob 86 as the gripper assembly is released from a disc while at the turntable. Cam 54 turns in a clockwise direction, as viewed from the back, during record gripping, delivery to turntable and return to rack. Lever 55 carries integral knob 86 and has a shaft 108 pivotally mounted on journal brackets 90 and 91 secured to post 72. The upper end of lever 55 is bifurcated at 92 and 93 to receive integral portion 94 of rack 56 (Figs. 12 and 13). Enlarged end 95 of rack 56 overlies these bifurcations, so that rack 56 moves to the front when lever 55 turns counterclockwise (Fig. 13) and to the rear when lever 55 turns clockwise.

Spring 67 has a guide 96 on pedestal 72 and compressively bears on pocket 97 of lever 55, tending to close the grippers on a record disc. Thus it will be seen that rack 56 is pulled to the rear when a record disc is gripped and is pushed toward the front when a disc is released. Since rack 56 goes back further for a 10 inch record than for a 12 inch record it constitutes a means for detecting the diameter of a record gripped by the gripper assembly. The position of rack 56 indicates the size of a record that has been gripped. Additionally, rack 56 constitutes an actuating member for causing the gripper assembly to grasp a record disc.

Figs. 4, 11, 12 and 13 clearly show how lever 55 controls rack 56. This rack has a solid rectangular portion 98, which snugly slidably fits into axial bore 50 of the barrel. The rack has two rows of teeth 110 and 111, which mesh, respectively with portions 112 and 113 of pinion 57. Although integral portions 98, 94, 95 are solid the remainder of rack 56 is formed as an open rectangle. The cluster pinion 57 is rotatably mounted on an axle 99, perpendicular to both bores of the barrel and fitted at one end to an aperture at the bottom of the barrel (Fig. 11) and at the top end to an apertured cap 100 secured in a well in the top of the barrel. The enlarged middle portion 115 of pinion 57 meshes with rack 58. When the barrel rotates about its axial bore, rack 56 and the spin-axis of pinion 57 turn in unison with the barrel 51 (Fig. 13). The wall of rack 56 is apertured to receive rack 58 (Fig. 13), which slidably projects through that wall. Rack 58 is generally rectangular in shape, one of its sides slidably abutting that side of rack 56 which carries teeth 110, another of its sides slidably abutting that side of rack 56 which carries teeth 111. A third side of rack 58 has teeth 116 engaging the teeth on portion 115 of pinion 57. The fourth side 117 is curved. Rack 58 is freely rotatably mounted on a cylindrical substantially concentric connector member 106, so that rack 58 maintains its engagement with pinion 115 when the connector member and mushroom 18 are rotated about the longitudinal axis of the mushroom 18 (i. e. transverse bore of barrel 51).

Cluster pinion 57 is preferably made in one piece. When rack 56 is pushed forwardly to release the grippers, pinion 57 turns clockwise (Fig. 4) and rack 58 moves to the left. Rack 58 is moved in the opposite direction when the grippers are closed on a record under the power derived from spring 67.

One end of rack 58 abuts collar 104 (Fig. 12) and this collar is rigidly secured to connector 106 by a pin 105. The other end of rack 58 abuts shank 107 of inner gripper 59. Shank 107 is hollow and is securely and rigidly fitted to connector 106. The outside of the shank is rectangular in shape and the rectangular shank slidably but closely projects through an opening in the walled end 125 of sleeve 103 (Fig. 14), such opening being complementary and rectangular, whereby sleeve 103, shank 107, connector 106 and collar 104 turn in unison within the transverse bore of barrel 51.

Elements 58, 104, 105, 106, 107 and 59 move in unison along the axis of the transverse bore. Elements 18, 101, 104, 105, 106, 107, 59, 103 turn in unison relative to barrel 51 about that axis, but rack 58 rotates on connector 106 and keeps its teeth in engagement with pinion 115 when those elements turn.

Shank 107 and one end of rack 58 can slide within the circular bore 119 of sleeve 103, and collar 104 and the other end of rack 58 can slide within the rectangular bore 120 of sleeve 101. Sleeve 101 is integral with mushroom 18. Sleeves 101 and 103 are generally cylindrical in exterior shape and are rotatably mounted within the transverse circular bore of barrel 51. Relative axial displacement of the sleeves is prevented by screws 121 and 122 projecting through the wall of barrel 51 into grooves 123 and 124 (Fig. 11). And each sleeve has an enlarged head 18 or 125.

Sleeves 101 and 103 rotate in unison because of the facts that bore 120 is rectangular, collar 104 is rectangular, shank 107 is rectangular, and head 125 of sleeve 103 has a rectangular aperture into which shank 107 fits. To further assure this synchronism, I continue the aperture in sleeve wall 125 to form a keyway 198 for shank 107. And I provide a similar keyway 199 for projecting portions of collar 104 (Fig. 11).

The two end results of the mechanism within the barrel are, therefore: (1) When lever 55 is turned the inner gripper 59 is moved toward or away from the record disc; (2) When mushroom 18 is rotated about the transverse bore axis of the barrel, the gripper 59 and head 125 are also rotated in unison with the mushroom.

Referring now specifically to Figs. 4 and 5 of the drawings, the gripper assembly is next described. It comprises an arcuate gripper support 102, having a top wall 126, a bottom wall 127 and an end wall 128. A flat arcuate member 60, terminating in a rack section 61 is rigidly secured to inner gripper 59. The rack 61 engages a pinion 62, rotatably mounted on an axle 129 secured to the gripper support by a screw 130, plate 131 and screws 132, 133. Rack 61 slides between pin 134 and pinion 62. The pinion in turn engages a rack section 63 of an arcuate member 64, rigidly secured to the outer gripper member 65. Rack section 63 slides between the end wall 128 of the gripper support and pinion 62. Arc 64 is stabilized and its motion is limited by a pin 135, secured to the arm 64 and projecting through a slot 136 in the gripper support. The end wall 128 is suitably apertured at 137 to permit limited movement of arc 64. When inner gripper 59 moves toward a record disc, outer member 65, being synchronized with element 59 by the racks and pinion, also moves toward the disc. Conversely, both gripper members are simultaneously released from the disc.

Fig. 4 shows the positions of the barrel mechanism parts when a record disc has been released, the disc being on the turntable. The full lines designated "A" show the positions of the gripper assembly parts when a record disc has been released. The dashed lines designated "B" show the positions of the gripper assembly when a 12 inch record 138 is being grasped. It will be noted that whenever the high surfaces of cam 54 clear knob 86, spring 67 (Fig. 13) turns lever 55 and causes grippers 59 and 65 (Fig. 4) to be closed on the record disc. If the disc has a 12 inch diameter the record is grasped automatically when lever 55 has turned clockwise (Fig. 13) by a certain amount. If the disc has a 10 inch diameter the record is grasped automatically when lever 55 has turned clockwise (Fig. 13) by a greater amount. Spring 67 causes the record automatically to be grasped whether it has a 12 inch or 10 inch diameter, so that no manual adjustment is required. I use this behavior of lever 55 to place the tone arm 24 in position "B" (Fig. 4) at the beginning of play of a 12 inch record and in position "C" at the beginning of play of a 10 inch record, so that the needle or pickup 139 (Fig. 3) is always automatically placed at the beginning of the record disc groove, no manual adjustment being required for the purpose.

*The tone arm and setting mechanism*

Secured to head 98 of rack 56 (Fig. 4) is a transversely extending pin 140. The function of this pin is to prevent stop member 141 (Figs. 14 and 4) from arresting the radial motion of the tone arm setting member 142 (Figs. 4 and 7) when a 10 inch record is to be played, but to permit that stop member to arrest the radial movement of the tone arm setting member 142 when a 12 inch record is to be played. Secured to post 72 is an L-shaped bracket 144. Stop member 141 is pivotally secured to bracket 144 at 145 and the downward swing of the rear end of the stop is limited by an integral pin 146 bearing on a cut out portion of bracket 144. The upward swing of the stop is determined by pin 140, therefore by head 98, therefore by the size of the record that has been grasped. When a 12 inch record is being grasped head 98 of rack 56 causes pin 140 to move rearwardly and as the record disc is delivered to the turntable and the tone arm is lowered pin 140 strikes the top surface of stop 141 in front of pivot 145 but does not swing the stop counterclockwise (Fig. 14) by a sufficient amount to prevent the stop from arresting the radial swing of the tone arm setting member 142 as the tone arm is lowered into playing position (see full line positions, Fig. 14). When a 10 inch record is being grasped rack 56 causes pin 140 to pass rearwardly by a sufficient amount to swing stop 141 (Fig. 14) counterclockwise to such a degree that the radial motion of setting member 142 is not arrested by stop 141 and setting member 142 simply slips under stop 141 as the tone arm is placed in playing position (see position C, Fig. 14).

Stop 141 is a light metal piece. Spring 148 is in tension between pin 146 and a pin 150 on bracket 144 and tends to swing stop 141 clockwise (Fig. 14). Stop 141, bracket 144, pin 140, spring 148, and pins 146 and 150 constitute control means responsive to the action of the detecting means 56 for controlling the tone-arm placing means in accordance with the diameter of a record disc being transported.

The tone arm placing means employed with the control means for positioning the tone arm in accordance with the size of the record disc grasped and transported is an important feature of the present invention. For a more complete description of the placing means, I now make reference to the tone arm 24, shown in Figs. 4, 14, 9, 7, 8 and 1. The initial position of the tone arm as record disc play starts is a function of two things: the position of the setting member 142 (Fig. 8) and the position of a cam follower member 152. I use stop 141 to adjust the relative positions of those members automatically in accordance with the size of the record disc to be played.

The mechanism for controlling the cam follower member 152 is now described. Referring now to Figs. 4, 8, and 14, the position of the cam 153, rigidly secured to shaft 29, controls the behavior of follower 152. It has heretofore been shown that shaft 29 turns clockwise, as seen from the rear, when a record disc is being transported from the magazine to the turntable. As this occurs, pin 154 on the cam follower is pushed to the front by cam surface 155 of cam 153 (Fig. 4) and follower 152 drops to cam surface 156 (Fig. 8). This action continues while the tone arm is turned clockwise (Fig. 4) and its needle or pickup lowered on to the record disc and until pin 154 registers with pocket 157 in cam 153. During the record play pin 154 is free to move within pocket 157 as the tone arm 24 traverses the record disc and elements 24, 142, 152, 154 then swing radially together. The setting element 142 is free to turn because it always ultimately passes below stop 141 as the tone arm needle is lowered on to the record disc, whether a 10 inch or a 12 inch record is to be played. It has been shown that element 142 strikes element 141 as the tone arm is turned clockwise (Figs. 4 and 14, to displace the setting member 142 from its normal angular position with respect to the cam follower 152, in the case of a 12 inch record, and thereafter element 142 falls below element 141 as the tone arm needle is lowered to the turntable.

The tone arm is pivotally mounted on the base 20 by a post 158, rotatably mounted in a well 159 (Fig. 8), integral with a support 160. Support 160 and journal 161 (Fig. 7) for shaft 29 are secured to base 20. Nut 162 (Fig. 8) on post 158 gives vertical support to setting element 142 and the upper portion of cam follower 152. Thus it will be seen that the position of cam follower 152 is controlled by cam 153. The angular position of setting element 142, while the tone arm is being placed in playing position, is entirely controlled by follower 152 when a 10 inch record is to be played. However, when a 12 inch record is to be played, stop 141 strikes setting element 142 and arrests the clockwise (Fig. 4) swing of tone arm 24, just before cam surface 156 permits the tone arm to be lowered into playing position. In that case the angular position of setting element 142 is controlled not only by follower 152 but also by stop member 141. While elements 141 and 142 are in contact element 142 does not swing but element 152 continues to swing. Thus I displace element 142 in a counterclockwise direction, as seen from the top, relative to element 153 when a 12 inch record is to be played. Members 152 and 142 are in frictional abutment and are swingably mounted on post 158.

Let it be assumed that a 12 inch record has just been played and that a 10 inch record is next to be played. It is then necessary to provide a means for displacing member 142 in a clockwise direction and restoring the normal angular relation of members 142 and 152 before the 10 inch record is played. I do this at the end of the 12 inch record program, by the interaction of member 142 with an adjustable rear stop 166, screwed on to bracket 167, secured to support 160 (Fig. 7). Members 142 and 152, being in frictional engagement, maintain their relative angular positions except when members 166 or 141 act on element 142.

When a record disc is returned from the turntable to the magazine the following events occur: Shaft 29 turns counterclockwise, as seen from front; gear 47 moves; flat 80 slips on flat 74; cam surface 88 (Fig. 10) clears knob 86; grippers 59 and 65 close on the record disc and gear 48 turns; cam surface 169 on tone arm cam 153 (Fig. 4) pushes pin 154 to the rear while cam surface 170 (Fig. 8) lifts the cam follower 152; the tone arm is lifted upwardly and swung radially outwardly away from the turntable and setting element 142 strikes stop 166 (Fig. 7), thus realigning members 142 and 152 and restoring the normal relative angular positions which they assume for 10 inch record play; the gripped record is returned to the magazine and finally released as cam surface 85 lifts knob 86 (Fig. 13).

The turntable 22 and the means for controlling and driving it during record play are conventional and need not be further described herein. Thus it will be seen that I provide adjustable means including members 142 and 152 for coupling the tone arm to the transfer mechanism. This means is normally operative to place the tone arm in playing position for a 10 inch record. I also provide means including member 141 for adjusting the coupling means automatically to place the tone arm in proper playing position for a 12 inch record disc.

According to one feature of my invention there is provided a novel guiding mechanism 68 for determining which side of a record disc is to be played. As clearly shown in Figs. 9, 10, 7, 11 and 13 this mechanism comprises an arcuate guide member 171, a lug or projection 69 on the mushroom 18 and a switch 172. Guide member 171 is made in one piece and is formed with a straight slot 173 (Fig. 9) and two curved branch slots 174 and 175 (Fig. 7) in communication with slot 173. The guide member has two turned-down portions 176 and 177 screwed to posts 72 and 73 (Fig. 7). The switch is secured to a shifter member 178 by a spacer 179 and rivets 180, 181 (Fig. 11).

When a record is moved from the magazine to the turntable, lug 69 on mushroom 18 rides initially in slot 172 and thereafter in slot 174, if the shifter 178 and switch 172 are thrown to the left (Fig. 7) or in slot 175 if the shifter 178 and switch 172 are thrown to the right (Fig. 7). When lug 69 rides in slot 174 as the barrel rotates the mushroom 18 is turned clockwise, looking at the mushroom, about the transverse bore axis of the barrel 51, and the record disc is laid on the turntable with its front (Fig. 1) side up. When lug 69 rides in slot 175, the mushroom 18 is turned counterclockwise and the record disc is laid on the turntable with its rear side up. The function of the shifter switch 172 is to cause the lug 69 to be guided to one or the other of slots 174, 175. It has been shown how the gripper assembly and the gripped record are turned about an axis in the plane of the record whenever mushroom 18 is turned. The guide member 171 and switch 172, by controlling lug 69, therefore control the direction of the twist imparted to the record disc during transportation between magazine and turntable.

When a record is returned to the rack, lug 69 initially slides in one of the slots 174 or 175 and then in slot 173. The ninety-degree twist imparted to the record during return is equal and opposite to that imparted to it during delivery.

The shifter 178 is slotted at 182, 183 and secured to posts 72, 73 (Fig. 7) by screws 184, 185, whereby it can be thrown to front (slot 175 open) and rear (slot 174 open) positions to cause the rear or front side of a record disc to be played. The shifter is coupled to the magazine mechanism 21 by suitable means, not here shown or per se claimed but fully disclosed in the aforementioned Green patent, so that slot 174 governs the mushroom twist if the last motion of the magazine before the transfer position was reached by the record disc was toward the front, but so that slot 175 governs if such motion was toward the rear.

The curved slots 174 and 175 and lug 69 render the mushroom and guide a very smooth-acting mechanism. Further, the shifter and switch afford a positive control action and dispense with springs.

While there has been shown and described what is at present considered to be the preferred embodiment of the present invention, it will be obvious to those skilled in the art that various modifications and substitutions of equivalents may be made without departing from the teachings of the invention and the proper scope thereof and it is accordingly intended in the appended claims to cover all such changes and modifications as fall within the true scope of the invention and outside of the scope of the prior art.

Having thus described my invention, I claim:

1. In an automatic phonograph record changer, a pivotally mounted transfer barrel formed with an axial bore and a transverse bore, a gripper mechanism for gripping either 10 inch or 12 inch record discs, said gripper mechanism being rotatably carried by said transfer barrel and including a gripper member slidably and rotatably mounted in said transverse bore, means including an actuating member slidably mounted in said axial bore for actuating said gripper member to cause said gripper mechanism to grip a record disc, said actuating member assuming one position when a 12 inch record disc is gripped and another position when a 10 inch record is gripped, driving means for intermittently rotating said barrel about its axial bore to transport a gripped record disc between storage and playing positions, a tone arm, adjustable means coupling said tone arm to said transfer mechanism and normally operative to place said tone arm in playing position for a 10 inch record disc when a record disc is placed in playing position, and a shiftable mechanical connection responsive to movement of said actuating member for adjusting said coupling means whereby said tone arm is automatically placed in playing position for a 12 inch record when a record disc of that size is transported from storage position to playing position.

2. In an automatic record changer, the combination of a transfer mechanism for transporting a record disc between storage and playing positions, a tone arm, means included in said transfer mechanism for mechanically detecting the diameter of a record disc being transported, means mechanically coupled to said transfer mechanism for placing said tone arm in either of a plurality of separate playing positions, and control means responsive to the action of said detecting means for controlling said tone-arm placing means in accordance with the diameter of the record disc being transported by said transfer mechanism, whereby said tone arm is placed in different playing positions for record discs of different diameters.

3. The combination in accordance with claim 2, and wherein the means for mechanically detecting the diameter of a record disc comprises a pair of gripper members and a gripper-actuating member movable to different positions to clamp said gripper members on a record disc, each of said positions furnishing an indication of the diameter of the disc being gripped.

4. The combination in accordance with claim 2 and in which the last-named control means comprises a pivotally mounted stop member responsive to action of the detecting means for arresting the motion of at least one part of the tone-arm placing means.

5. In an automatic record changer, the combination of a transfer mechanism for transporting a record disc between storage and transfer positions, a tone arm, means included in said transfer mechanism for mechanically detecting whether the record disc being transported has a 10 inch or 12 inch diameter, means mechanically coupled to said transfer mechanism for placing said tone arm in either of two separate playing positions and normally operative to place the tone arm in playing position for a 10 inch record disc, and control means responsive to the action of said detecting means for controlling said tone-arm placing means to cause it to place the tone arm in playing position for a 12 inch record disc when a 12 inch record disc is being transported.

6. In an automatic record changer, the combination of a transfer mechanism for transporting a record disc between storage and playing positions, a tone arm, means included in said transfer mechanism for mechanically detecting whether the record disc being transported has a 10 inch or a 12 inch diameter, means mechanically coupled to said transfer mechanism for placing said tone arm in either of two separate playing positions and normally operative to place the tone arm in playing position for a 10 inch record disc, control means responsive to the action of said detecting means for controlling said tone-arm placing means to cause it to place the tone arm in playing position for a 12 inch record disc when a 12 inch record disc is being transported, and means for restoring said arm-placing means to its normally operative condition when said tone arm is withdrawn from playing position and a 12 inch record disc is returned to storage position.

7. In an automatic record changer of the type including a magazine, a turntable and a tone arm, the combination of a pivotally mounted transfer barrel having axial and transverse bores, a gripper mechanism rotatably journaled in said transverse bore for gripping and releasing either 10 inch or 12 inch record discs, means for imparting to said gripper mechanism a quarter turn about said transverse bore during transportation of a record disc from storage position to playing position, means for actuating said gripper mechanism to grip a record disc before it is taken from storage position and to release said disc when it is placed in playing position, said means including an actuating member slidably and non-rotatably mounted in but projecting from said axial bore, said actuating member assuming one position when a 10 inch record disc is gripped and another position when a 12 inch record disc is gripped, means for rotating said barrel and actuating member about said axial bore to transport a gripped record disc from storage position to playing position, a pivotally mounted stop lever, means projecting transversely from said actuating member for turning said lever by an amount determined by the diameter of the record disc being transported, and adjustable means for swinging said tone arm toward said turntable as a record disc is transported to playing position, said stop lever engaging said adjustable means to place said tone arm in a proper playing position determined by the diameter of said record disc.

8. In an automatic phonograph a transfer mechanism comprising, in combination, a pivotally mounted barrel formed with axial and transverse bores, said barrel being rotatable about its axial bore, a pair of sleeves rotatably carried by said transverse bore, one of said sleeves having an apertured end wall and the other of said sleeves having a closed end wall and a bore, a pair of synchronized record grippers including a shank slidably but non-rotatably projecting through the complementary aperture in said one of said sleeves, said grippers being opened and closed by displacement of said shank relative to said one of said sleeves, means including a hollow rack abutting said shank and a connector member projecting from the shank through the rack and a collar rigidly secured to the connector member for displacing said shank, said collar being slidably but non-rotatably mounted within the bore in said other sleeve, said rack being rotatably mounted on said connector member, a cluster pinion secured to said barrel for driving said rack, whereby said grippers and shank and sleeves and connector and collar are rotatable in unison with respect to said transverse bore, while said pinion prevents rotation of said rack within said transverse bore, and an actuating rack non-rotatably but slidably mounted in said axial bore for driving said cluster pinion and actuating said grippers, the position assumed by said actuating rack when a record disc has been gripped depending on the diameter of the disc.

9. The combination in accordance with claim 8 in which said other sleeve has a projection on its end wall, and guide means including a switch for engaging said projection to turn the grippers relative to said transverse bore during rotation of said barrel on its pivotal axis.

10. In an automatic phonograph, a transfer comprising a pivotally mounted barrel, gripping means rotatably mounted in the barrel and including a projection presented at one end of the barrel, a guide including a straight slot and intersecting alternate diverging slots mounted adjacent the barrel so that said projection is guided by one of said slots, and a switch shiftably mounted on the guide at the intersection of said slots so that when it is moved in one direction or the other one of said diverging slots engages said projection to turn the gripping means laterally in accordance with the position of the switch.

ANTHONY M. KASNOWICH.

References Cited in the file of this patent

UNITED STATES PATENTS

| Number | Name | Date |
|---|---|---|
| Re. 21,514 | Green | July 23, 1940 |
| 1,401,429 | Moone | Dec. 27, 1921 |
| 1,741,040 | Seal et al. | Dec. 24, 1929 |
| 1,811,832 | Mayers | June 23, 1931 |
| 1,907,500 | Chiffey | May 9, 1933 |
| 1,968,245 | Bussoz | July 31, 1934 |
| 2,118,541 | Yerder | May 24, 1938 |
| 2,205,268 | Mitchell | June 18, 1940 |
| 2,298,145 | Merrylees | Oct. 6, 1942 |
| 2,311,596 | Pressley | Feb. 16, 1943 |
| 2,337,178 | Breslav | Dec. 21, 1943 |
| 2,352,331 | Leline | June 27, 1944 |
| 2,490,678 | Dale | Dec. 6, 1949 |
| 2,546,845 | Andres | Mar. 27, 1951 |